US012711179B2

(12) United States Patent
Teflioudi et al.

(10) Patent No.: US 12,711,179 B2
(45) Date of Patent: Aug. 18, 2026

(54) REPARALLELIZATION FOR WORKLOAD SKEWING DATABASE OPERATIONS

(71) Applicant: SAP SE, Walldorf (DE)

(72) Inventors: Christina Teflioudi, Heidelberg (DE); Paul Willems, Heidelberg (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 442 days.

(21) Appl. No.: 17/736,404

(22) Filed: May 4, 2022

(65) Prior Publication Data

US 2023/0359671 A1 Nov. 9, 2023

(51) Int. Cl.
*G06F 16/00* (2019.01)
*G06F 16/903* (2019.01)

(52) U.S. Cl.
CPC .............................. *G06F 16/90335* (2019.01)

(58) Field of Classification Search
CPC ................................................ G06F 16/90335
USPC ........................................................ 707/769
See application file for complete search history.

(56) References Cited

U.S. PATENT DOCUMENTS 8,219,537 B1 * 7/2012 Anderson ......... G06F 16/24532 707/705
9,514,214 B2 * 12/2016 Chandramouli ........ G06F 16/27
10,387,415 B2 * 8/2019 Chainani ............. G06F 16/2471
10,545,965 B2 * 1/2020 Sun ....................... G06F 9/4881
10,585,889 B2 * 3/2020 Kavulya ........... G06F 16/24544
11,755,568 B1 * 9/2023 Akidau ............. G06F 16/24539 707/717
12,013,852 B1 * 6/2024 Echeverria ........ G06F 16/24532
12,242,892 B1 * 3/2025 Burnett ............... G06F 9/45533
2008/0092142 A1 * 4/2008 Tran ...................... G06F 9/5083 718/105
2010/0042631 A1 * 2/2010 Shuf ................ G06F 16/24532 707/E17.044
2014/0089311 A1 * 3/2014 Richards ........... G06F 16/24549 707/E17.046
2016/0098481 A1 * 4/2016 Zhang ..................... G06F 16/35 707/752
2016/0203169 A1 * 7/2016 Ross ................... G06F 16/2228 707/737
2016/0328273 A1 * 11/2016 Molka ...................... A61B 8/00
2017/0185648 A1 * 6/2017 Kavulya ........... G06F 16/24554
2017/0371928 A1 * 12/2017 Chainani ........... G06F 16/24545
2019/0286635 A1 * 9/2019 Yu ........................... G06F 16/26
2019/0384843 A1 * 12/2019 White ................. G06F 16/9024
(Continued)

*Primary Examiner* — Ann J Lo
*Assistant Examiner* — Rezwanul Mahmood
(74) *Attorney, Agent, or Firm* — Mintz Levin Cohn Ferris Glovsky and Popeo, P.C.

(57) ABSTRACT

A method for parallelization may include identifying, within a sequence of operations comprising a query pipeline for executing a query, a workload skewing operation whose input dataset and output dataset exhibit an above-threshold difference in size. A reparallelization point may be inserted in the query pipeline subsequent to the workload skewing operation. The reparallelization point including a scheduling operation configured to determine a task size for performing one or more operations following the workload skewing operation in the query pipeline. The query may be executed by performing the sequence of operations comprising the query pipeline. Related systems and computer program products are also provided.

14 Claims, 6 Drawing Sheets

(56) References Cited

U.S. PATENT DOCUMENTS

| | | | | |
|---|---|---|---|---|
| 2020/0005015 | A1* | 1/2020 | Liang | G06V 20/695 |
| 2020/0026788 | A1* | 1/2020 | Bellamkonda | G06F 16/2456 |
| 2020/0065413 | A1* | 2/2020 | Sakamuri | G06F 7/24 |
| 2020/0364223 | A1* | 11/2020 | Pal | G06F 16/24539 |
| 2021/0081453 | A1* | 3/2021 | Eadon | G06F 16/278 |
| 2021/0089535 | A1* | 3/2021 | Chen | G06F 16/24542 |
| 2021/0097044 | A1* | 4/2021 | Idreos | G06F 16/21 |
| 2021/0263929 | A1* | 8/2021 | Chen | G06F 16/24539 |
| 2023/0297573 | A1* | 9/2023 | Oswal | G06F 16/24542 707/714 |
| 2023/0359671 | A1* | 11/2023 | Teflioudi | G06F 16/90335 |
| 2024/0143595 | A1* | 5/2024 | Bove | G06F 16/24553 |

* cited by examiner

REPARALLELIZATION FOR WORKLOAD SKEWING DATABASE OPERATIONS

TECHNICAL FIELD

The subject matter described herein relates generally to database processing and more specifically to parallel processing.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for reparallelization. In some example embodiments, there is provided a system that includes at least one processor and at least one memory. The at least one memory may include program code that provides operations when executed by the at least one processor. The operations may include: identifying, within a sequence of operations comprising a query pipeline for executing a query, a workload skewing operation whose input dataset and output dataset exhibit an above-threshold difference in size; inserting, in the query pipeline, a reparallelization point subsequent to the workload skewing operation, the reparallelization point including a first scheduling operation configured to determine a first task size for performing at least a first operation following the workload skewing operation in the query pipeline; and executing the query by at least performing the sequence of operations comprising the query pipeline.

In some variations, one or more features disclosed herein including the following features can optionally be included in any feasible combination. The first task size may be determined based at least on a quantity of time required to perform at least the first operation on a portion of the output dataset from the workload skewing operation.

In some variations, the scheduling operation may be configured to gather the output dataset of the workload skewing operation into one or more buffers.

In some variations, the scheduling operation may be further configured to schedule, based at least on the first task size, one or more corresponding tasks for performance by a corresponding quantity of threads once the one or more buffers are full. Data associated with each task may be pushed to at least the first operation following the workload skewing operation.

In some variations, the scheduling operation may be configured to avoid parallelization based at least on a first time required to gather the output dataset of the workload skewing operation into one or more buffers exceeding a second time required to perform at least the first operation following the workload skewing operation.

In some variations, the scheduling operation may be configured to avoid parallelization based at least on there being less than a threshold quantity of tasks of the first task size.

In some variations, the one or more buffers may be configured to accommodate data for multiple tasks. The scheduling operation may be configured to schedule the multiple tasks in parallel.

In some variations, the query pipeline may further include a second scheduling operation configured to determine a second task size for performing at least a second operation preceding the workload skewing operation.

In some variations, the second task size may be determined based at least on a quantity of time required to perform at least the second operation to generate the input dataset of the workload skewing operation.

In some variations, the workload skewing operation may include a selective join operation, an expanding join operation, or a selective table scan operation.

In some variations, the workload skewing operation may be identified based on a compile time estimation and/or a runtime estimation of a first size of the input dataset and a second size of the output dataset.

In another aspect, there is provided a method for reparallelization. The method may include: identifying, within a sequence of operations comprising a query pipeline for executing a query, a workload skewing operation whose input dataset and output dataset exhibit an above-threshold difference in size; inserting, in the query pipeline, a reparallelization point subsequent to the workload skewing operation, the reparallelization point including a first scheduling operation configured to determine a first task size for performing at least a first operation following the workload skewing operation in the query pipeline; and executing the query by at least performing the sequence of operations comprising the query pipeline.

In some variations, one or more features disclosed herein including the following features can optionally be included in any feasible combination. The first task size may be determined based at least on a quantity of time required to perform at least the first operation on a portion of the output dataset from the workload skewing operation.

In some variations, the scheduling operation may be configured to gather the output dataset of the workload skewing operation into one or more buffers. The scheduling operation may be further configured to schedule, based at least on the first task size, one or more corresponding tasks for performance by a corresponding quantity of threads once the one or more buffers are full. Data associated with each task may be pushed to at least the first operation following the workload skewing operation.

In some variations, the scheduling operation may be configured to avoid parallelization based at least on a first time required to gather the output dataset of the workload skewing operation into one or more buffers exceeding a second time required to perform at least the first operation following the workload skewing operation.

In some variations, the scheduling operation may be configured to avoid parallelization based at least on there being less than a threshold quantity of tasks of the first task size.

In some variations, the one or more buffers may be configured to accommodate data for multiple tasks. The scheduling operation may be configured to schedule the multiple tasks in parallel.

In some variations, the query pipeline may further include a second scheduling operation configured to determine a second task size for performing at least a second operation preceding the workload skewing operation. The second task size may be determined based at least on a quantity of time required to perform at least the second operation to generate the input dataset of the workload skewing operation.

In some variations, the workload skewing operation may be identified based on a compile time estimation and/or a runtime estimation of a first size of the input dataset and a second size of the output dataset.

In another aspect, there is provided a computer program product including a non-transitory computer readable medium storing instructions. The instructions may cause operations may executed by at least one data processor. The operations may include: identifying, within a sequence of operations comprising a query pipeline for executing a query, a workload skewing operation whose input dataset and output dataset exhibit an above-threshold difference in size; inserting, in the query pipeline, a reparallelization point subsequent to the workload skewing operation, the reparallelization point including a first scheduling operation configured to determine a first task size for performing at least a first operation following the workload skewing operation in the query pipeline; and executing the query by at least performing the sequence of operations comprising the query pipeline.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to reparallelization for database operations that introduce skews in workloads, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
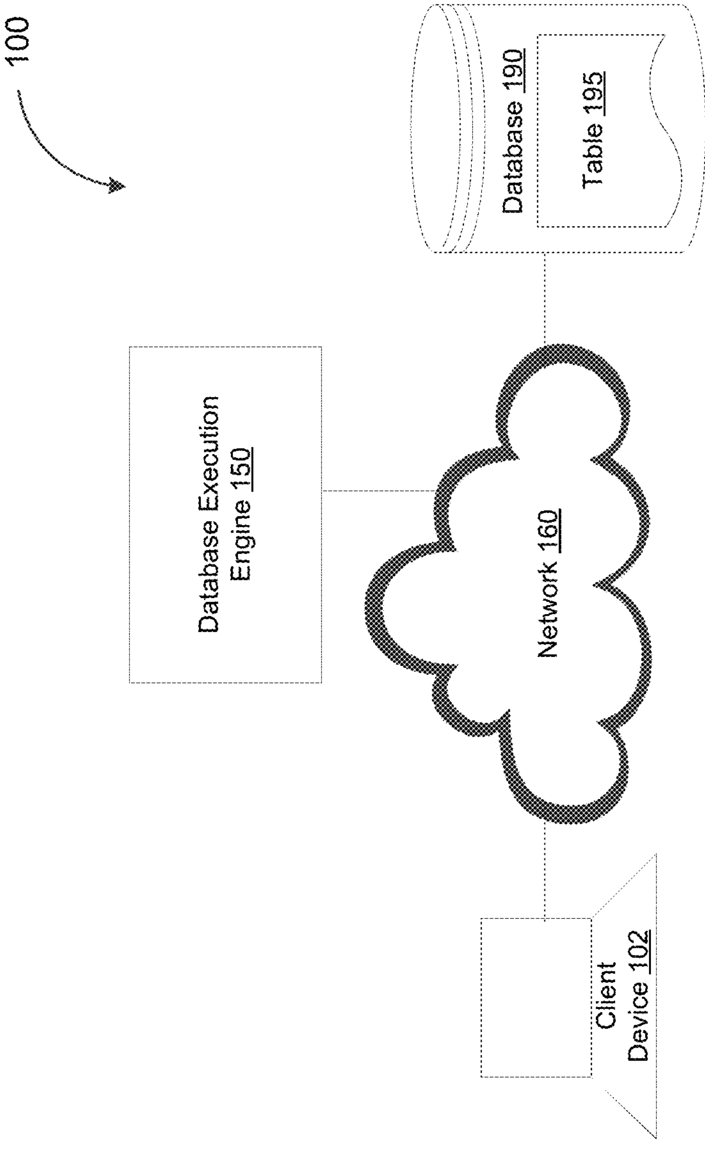
FIG. 1 depicts a system diagram illustrating an example of a database system, in accordance with some example embodiments.

An in-memory relational database may utilize main memory for the primary storage of database tables. In some cases, the in-memory relational database may be implemented as a column-oriented database (or a columnar database) that stores data from database tables by columns instead of by rows. As noted, each tuple of a relation may correspond to a record occupying one row of a database table while the columns of the database table may store the values of the common attributes shared by multiple tuples. Thus, in the columnar database, the values occupying each column of the database table, which may span multiple rows (or records) of the database table, may be stored sequentially in one or more data pages, with each data page storing at least a portion of a column. The in-memory column-oriented relational database may support efficient data compression and partitioning for massively parallel processing. Moreover, because the in-memory database is directly accessible by the central processing unit (CPU) of the computing engine, transactions accessing the in-memory database may be executed to provide near-instantaneous results.

The throughput and storage capacity of a database, such as an in-memory column-oriented relational database, may be maximized by distributing the processing and storage of data across multiple computing nodes. A single database table may therefore be divided into multiple partitions (or internal tables), for example, through one or more of hash partitioning, round-robin partitioning, and range partitioning, and stored across multiple computing nodes. Doing so may maximize opportunities for parallelization in which a single query is divided into multiple tasks and assigned to individual worker threads for parallel execution. As used herein, the term "worker thread" may refer to a thread or thread of execution, which is a sequence of instructions managed independently by a scheduler. Individual worker threads (e.g., the corresponding sequences of instructions) may be scheduled for sequential execution and/or parallel execution by one or multiple central processing units (CPUs).

In such a parallelization framework, a data execution engine may divide a query accessing a dataset (e.g., including one or more database tables) into multiple tasks. During a sampling phase, the data execution engine may determine the size of the individual tasks based on the quantity of time required to execute the query on a portion the dataset having a predetermined size. As such, if a large quantity of time is required to execute the query on the portion of the dataset, the data execution engine may determine that the query is computationally intensive and thus divide the query into a larger quantity of smaller tasks. Meanwhile, the quantity of worker threads allocated to execute the query may be determined based on the progress of the query observed at various time intervals. For instance, upon allocating an initial quantity of worker threads to perform the tasks associated with the query, the data execution engine may monitor the progress of the query (e.g., the quantity of tasks that have not been performed by any worker threads, the quantity of tasks that have been performed relative to the total quantity of outstanding tasks, and/or the like) to determine whether to increase that initial quantity of worker threads. That is, if the data execution engine detects an insufficient progress, the data execution engine may allocate additional worker threads to perform the tasks associated with the query.

The query operating on the dataset may be associated with a query plan, which may include a pipeline having a sequence of operations for executing the query. In a conventional parallelization framework, a single scheduling operation may be performed to determine the size of the individual tasks based on quantity of time required to perform some but not all of the operations in the pipeline. In particular, the size of the individual tasks for the entire pipeline may be determined based on the quantity of time required to perform the operations in the earlier portion of the pipeline but ignores those operations that are in the later portion of the pipeline. Accordingly, the data execution engine may fail to determine a suitable task size in cases where one or more operations in the pipeline introduces a skew in the workload for subsequent operations in the pipeline. For example, in cases where the pipeline includes one or more computationally inexpensive operations followed by one or more computationally expensive operations, the data execution engine may divide the query into excessively large tasks that are suitable for the computationally inexpensive operations but not for the subsequent computationally expensive operations that are more optimally performed with a smaller task size.

In some example embodiments, instead of a single parallelization operation that evaluates the operations at the beginning of the pipeline for executing a query, the database execution engine may be configured to introduce one or more reparallelization points in the pipeline. For example, the database execution engine may be configured to identify, within the pipeline, one or more workload skewing operations whose input dataset and output dataset exhibit an above-threshold difference in size. Examples of workload skewing operations include join operations, table scan operations, and/or the like. Accordingly, in addition to a first scheduling operation that is performed to determine a first task size based on a first quantity of time required to perform a first operation in the pipeline on an initial input dataset, the data execution engine may insert a second scheduling operation after at least a second operation in the pipeline if the second operation is identified as a workload skewing operation.

In some example embodiments, at each reparallelization point, a corresponding scheduling operation may be performed to determine a task size for one or more subsequent operations in the pipeline based on the quantity of time required to perform the one or more subsequent operations on a portion of the output dataset from the preceding operations in the pipeline. For example, the second scheduling operation may be configured to determine a second task size for a third operation following the second operation based at least on a second quantity of time required to perform the third operation on a portion of the output dataset from the second operation. Thus, while the first operation and the second operation may be performed by dividing the input dataset into a first quantity of tasks having the first task size, the third operation may be performed by dividing the output dataset of the second operation into a second quantity of tasks having the second task size. It should be appreciated that the data execution engine may still insert additional reparallelization points in the pipeline if, for example, the third operation is also identified as a workload skewing operation.

FIG. 1 depicts a system diagram illustrating an example of a database system 100, in accordance with some example embodiments. Referring to FIG. 1, the database system 100 may include one or more client devices 102, a database execution engine 150, and one or more databases 190. As shown in FIG. 1, the one or more client devices 102, the database execution engine 150, and the one or more databases 190 may be communicative coupled via a network 160. The one or more databases 190 may include a variety of relational databases including, for example, an in-memory database, a column-based database, a row-based database, and/or the like. The one or more client devices 102 may include processor-based devices including, for example, a mobile device, a wearable apparatus, a personal computer, a workstation, an Internet-of-Things (IoT) appliance, and/or the like. The network 140 may be a wired network and/or wireless network including, for example, a public land mobile network (PLMN), a local area network (LAN), a virtual local area network (VLAN), a wide area network (WAN), the Internet, and/or the like.

Figure 2:
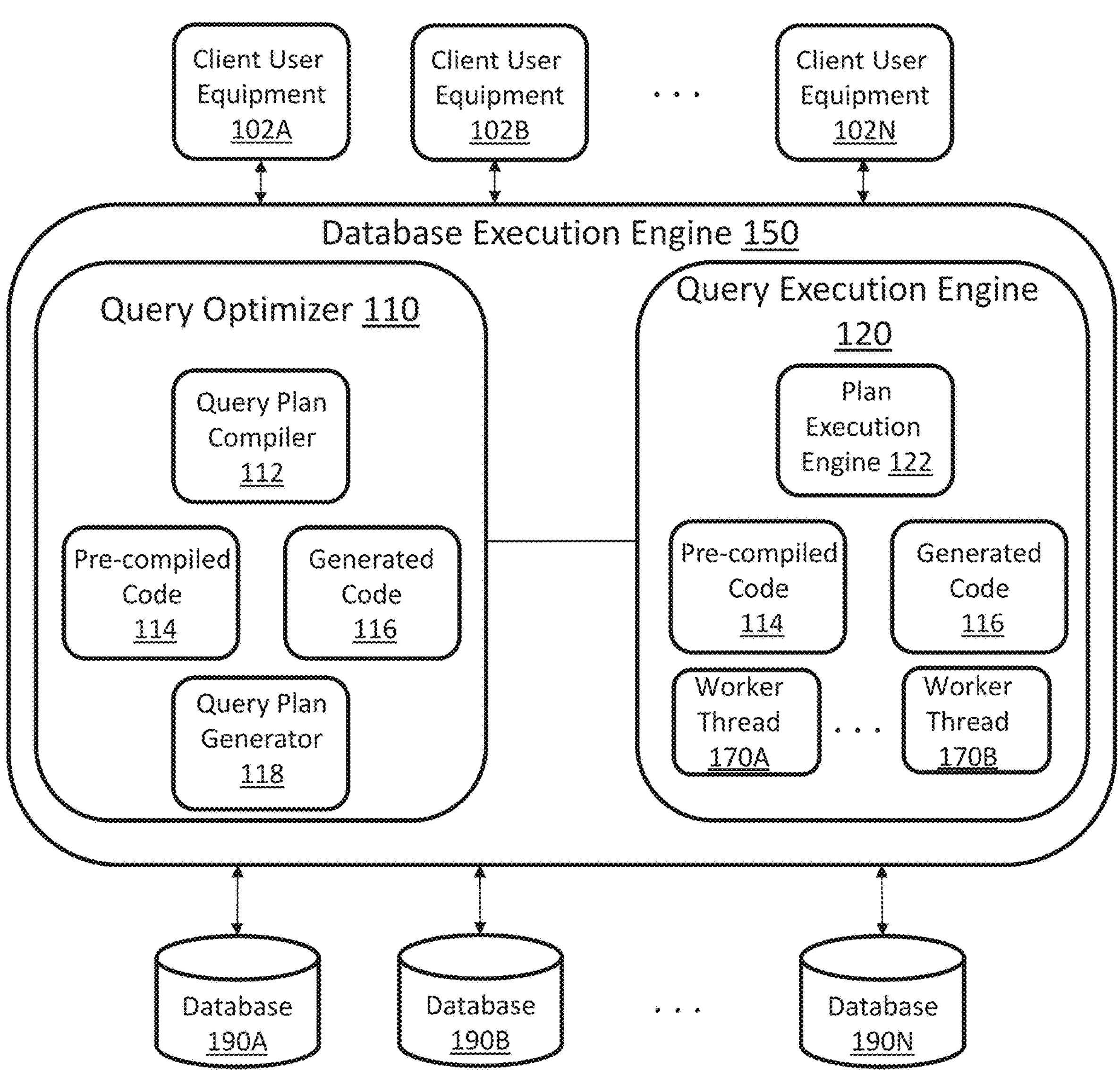
FIG. 2 depicts a block diagram illustrating an example of a database execution engine, in accordance with some example embodiments.

FIG. 2 depicts a block diagram illustrating an example of the data execution engine 150, in accordance with some example embodiments. As shown in FIG. 2, the one or more databases 190, which may include a first database 190A, a second database 190B, and a third database 190C, can represent the database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices 102, which may include the client devices 102A-N, may send a query via the data execution engine 150 to the database layer including the one or more databases 190, which may represent a persistence and/or storage layer where database tables may be stored and/or queried. The query may be sent via a connection, such as a wired connection and/or wireless connection (e.g., the Internet, cellular links, WiFi links, and/or the like) provided, for example, by the network 160.

Referring again to FIG. 2, the database execution engine 150 may include a query optimizer 110, such as a SQL optimizer and/or another type of optimizer, to receive at least one query from the one or more client devices 102 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra." The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190.

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

In some example embodiments, the query optimizer 110 may optimize the query plan by compiling and generating code. Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 102. The pre-compiled code 114 and/or the generated code 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 150 and sending some of the operations (or commands in support of an operation, such as a read, write, and/or the like) for execution at one or more of one or more database 190.

The query execution engine 120 may, as noted, be configured to handle different types of databases and the corresponding persistent layers and/or tables therein. For example, the one or more databases 190 may include at least one row-oriented database, in which case an insert is performed by adding a row with a corresponding row identifier. Alternatively and/or additionally, where the one or more databases 190 include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190. Moreover, the query execution engine 120 may perform other operations including rule-based operations, such as joins and projections, as well as filtering, group by, multidimensional analysis, and/or the like to reduce the processing burden on the database layer. In this way, the query execution engine 120 may execute these and other complex operations, while the one or more databases 190 can perform simpler operations to reduce the processing burden at the one or more databases 190.

In some example embodiments, the query execution engine 120 may run, as noted above, the generated code 116 generated for some query operations, while the pre-compiled code 114 may be run for other operations. Moreover, the query execution engine 120 may combine the generated code 116 with the pre-compiled code 114 to further optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

In some example embodiments, the database layer may provide distributed data storage in which the processing and storage of data is distributed across multiple nodes including, for example, the first database 190A, the second database 190B, the third database 190C, and/or the like. Accordingly, to store a database table 195 at the one or more databases 190, the data execution engine 150 may divide the database table 195 into multiple partitions by applying one or more of a hash partitioning, round-robin partitioning, and range partitioning. For example, as shown in FIG. 3, the database table 195 may be divided into a first partition 165*a*, a second partition 165*b*, and a third partition 165*c*. Moreover, the first partition 165*a* may be stored at the first database 190A, the second partition 165*b* may be stored at the second database 190B, and the third partition 165*c* may be stored at the third database 190C.

To execute a query accessing a dataset that includes, for example, the database table 195, the data execution engine 150 may divide the query into multiple tasks. For example, during a sampling phase, the data execution engine 150 may determine the size of the individual tasks based on the quantity of time required to execute the query on a portion the dataset having a predetermined size. Accordingly, if a large quantity of time is required to execute the query on the portion of the dataset, the data execution engine 150 may determine that the query is computationally intensive and thus divide the query into a larger quantity of smaller tasks. Alternatively, the data execution engine 150 may divide a computationally inexpensive query into a smaller quantity of larger tasks if a small quantity of time is required to execute the query on the portion of the dataset.

One or more of the worker threads 170 (e.g., a first worker thread 170A, a second worker thread 170B, and/or the like) may be allocated to perform the tasks associated with the query. The quantity of the worker threads 170 the data execution engine 150 allocates may be determined based on the progress of the query observed at various time intervals.

For instance, upon allocating an initial quantity of the worker threads 170 to perform the tasks associated with the query, the data execution engine 150 may monitor the progress of the query (e.g., the quantity of tasks that have not been performed by any the worker threads 170, the quantity of tasks that have been performed relative to the total quantity of outstanding tasks, and/or the like) to determine whether to increase that initial quantity of the worker threads 170.

In a conventional parallelization framework, a single scheduling operation may be performed to determine the size of the individual tasks based on quantity of time required to perform some but not all of the operations associated with the query. For example, where the query plan for the query includes a pipeline having a sequence of operations for executing the query, the size of the individual tasks for the entire pipeline may be determined based on the quantity of time required to perform the operations in the earlier portion of the pipeline but not those operations that are in the later portion of the pipeline. Accordingly, the data execution engine 150 may fail to determine a suitable task size in cases where one or more operations in the pipeline introduces a skew in the workload for subsequent operations in the pipeline. For example, in cases where the pipeline includes one or more computationally inexpensive operations followed by one or more computationally expensive operations, the data execution engine 150 may divide the query into excessively large tasks that are suitable for the computationally inexpensive operations but not for the subsequent computationally expensive operations that are more optimally performed with a smaller task size.

In some example embodiments, instead of a single parallelization operation that evaluates the operations at the beginning of the pipeline for executing a query, the database execution engine 150, for example, the query plan generator 118 of the query optimizer 110, may be configured to introduce one or more reparallelization points in the pipeline. For example, the database execution engine 150 may be configured to identify, within the pipeline, one or more workload skewing operations. As used herein, the term "workload skewing operation" may refer to a database operation whose input dataset and output dataset exhibits more than a threshold difference in size. For example, the size of the output dataset of a workload skewing operation may be either more than a threshold larger or smaller than the input dataset of the workload skewing operation. Examples of workload skewing operations include join operations, table scan operations, and/or the like. Accordingly, in addition to a first scheduling operation that is performed to determine a first task size based on a first quantity of time required to perform a first operation in the pipeline on an initial input dataset, the data execution engine may insert at least a second scheduling operation after a second operation in the pipeline if the second operation is identified as a workload skewing operation.

Figure 3A:
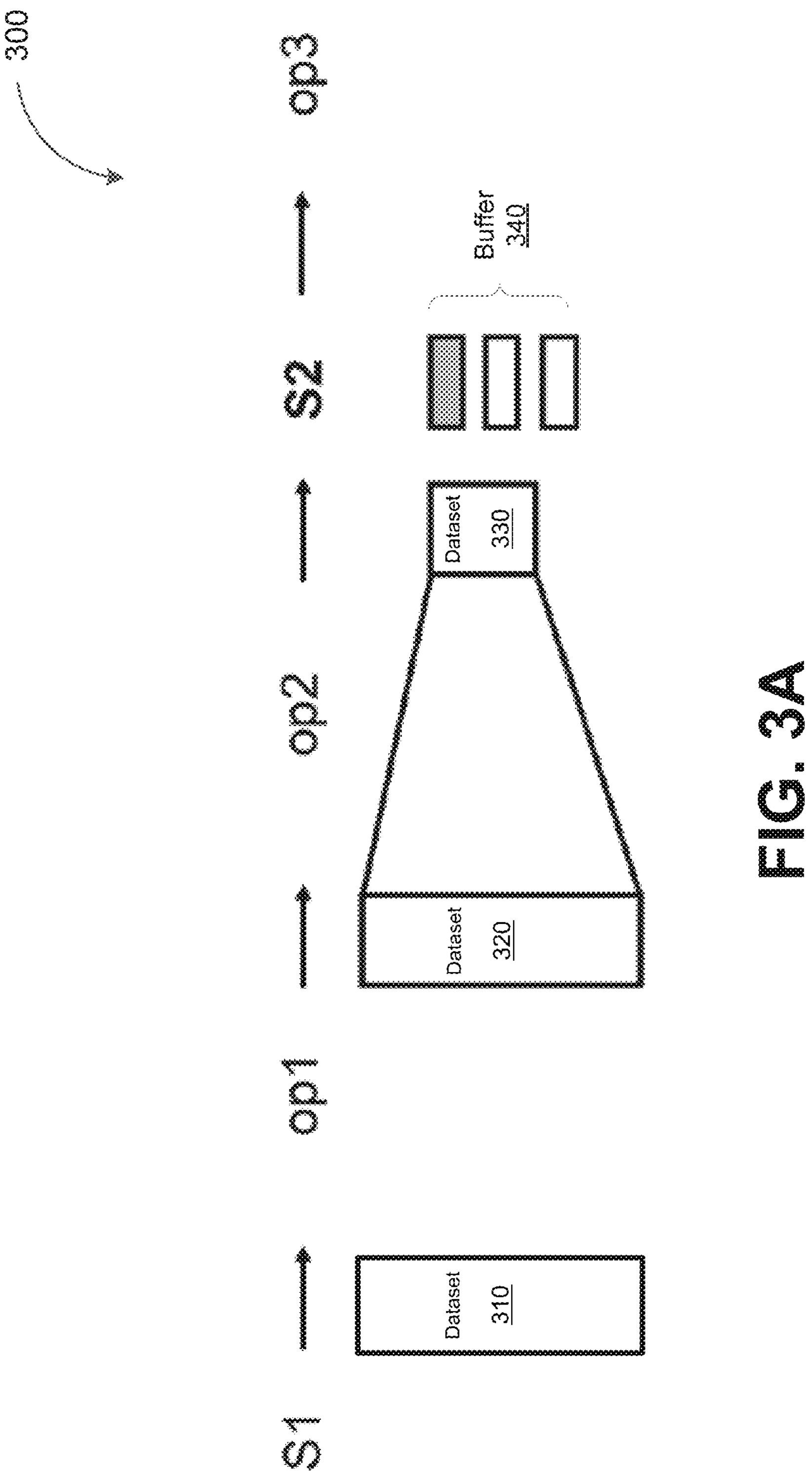
FIG. 3A depicts a schematic diagram illustrating an example of a query pipeline 300 with a reparallelization point, in accordance with some example embodiments.

In some example embodiments, at each reparallelization point, a corresponding scheduling operation may be performed to determine a task size for one or more subsequent operations in the pipeline based on the quantity of time required to perform the one or more subsequent operations on a portion of the output dataset from the preceding operations in the pipeline. To further illustrate, FIG. 3A depicts a schematic diagram illustrating an example of a query pipeline 300 with a reparallelization point, in accordance with some example embodiments. As shown in FIG. 3A, the query pipeline 300 may include a first operation op1 followed by a second operation op2 and a third operation op3. For example, FIG. 3A shows that the first operation op1 may ingest a first dataset 310 to output a second dataset 320, which may in turn be ingested by the second operation op2 to output a third dataset 330. Moreover, FIG. 3A shows that the query pipeline 300 may include a first scheduling operation S1, which may be performed to determine, based at least on a first quantity of time required to perform the first operation op1 on a portion of the first dataset 310, a first task size for the first operation op1 and the second operation op2.

In some example embodiments, the data execution engine 150 may insert a second scheduling operation S2 in the query pipeline 300 after the second operation op2 upon determining that the second operation op2 is a workload skewing operation. For example, as shown in FIG. 3A, the second operation op2 may be identified as a workload skewing operation based at least on the size of the third dataset 330 output by the second operation op2 being a threshold quantity smaller than the size of the second dataset 320 ingested by the second operation op2. Accordingly, the data execution engine 150 may insert the second scheduling operation S2 in the query pipeline 300 after the second operation op2 such that the second scheduling operation S2 may be performed to determine, based at least on a second quantity of time required to perform the third operation op3 on a portion of the third dataset 330, a second task size for at least the third operation op3. For example, as shown in FIG. 3A, the second scheduling operation S2 may copy the second dataset 320 output by the second operation op2 into one or more buffers 340 and may schedule subsequent tasks once the one or more buffers 340 are full. In the event the third operation op3 is not determined to be a workload skewing operation, the second task size may remain applicable to one or more operations that follow the third operation op3 in the query pipeline 300. In some cases, the first task size and/or the second task size may be subjected to a lower bound (e.g., a minimum task size). To ensure there are a sufficient quantity of tasks for each active thread, the minimum task size may be defined as $$\frac{\text{expected output size}}{f \times \text{number of processing cores}}.$$

The factor f may be set to a default value (e.g., 10). The minimum tasks size in this case would ensure that each processing core is assigned an average of an f quantity of tasks to work at a minimum. If the results of the sampling phase indicates that a particular query is computationally inexpensive, larger sized tasks may be created. Nevertheless, setting a minimum task size does prevent the creation of too many small tasks, which imposes excessive overhead, particularly where a portion of the query is computationally expensive.

The insertion of one or more reparallelization points, for example, in the query pipeline 300, may obviate scenarios in which the data execution engine 150 applies a task size that is suitable for some but not all of the operations in the query pipeline 300. For instance, in the example of the query pipeline 300 shown in FIG. 3A, the first task size for performing the first operation op1 and the second operation op2 may not be suitable for performing the third operation op3 at least because the third operation op3 is less computationally intensive and is therefore more optimally performed as a smaller quantity of larger sized tasks. Nevertheless, the insertion of each reparallelization point may introduce a number of drawbacks including, for example, the time and memory overhead associated with copying the third dataset 330 output by the second operation op2 into the one or more buffers 340. That sampling is now performed at multiple points of the query pipeline 300 may increase fluctuations in runtime (and other inconsistencies) between different runs of the same query. Moreover, since a single worker thread is buffering the data for tasks that different worker threads are going to process, the memory access pattern of the worker threads is not as cache-friendly as before. In general, buffering data for a number of tasks has a less favorable memory access pattern than that associated with pipelining.

In light of the aforementioned drawbacks, the data execution engine 150 may insert reparallelization points where doing so may realize maximum benefit. For example, as noted, the data execution engine 150 may insert reparallelization points after a workload skewing operation whose input dataset and output dataset exhibit an above-threshold difference in size. Examples of workload skewing operations include join operations, table scan operations, and/or the like. For join operations, the data execution engine 150 may insert a reparallelization point after a join operation if the join operation is determined to be a selective join operation or an expanding join operation based on compile-time estimations of the respective sizes of the input and output datasets. In the case of table scan operations, the data execution engine 150 may insert a reparallelization point after a table scan operation that is determined to be a selective table scan operation based on compile-time and/or runtime estimations of the respective sizes of the input and output datasets.

To further illustrate, Table 1 below depicts example configuration parameters for controlling the selectivity bounds that determines whether an operation, such as a table scan operation, is considered selective.

TABLE 1

| |
|---|
| disable_reparallelization_lower_bound, disable_reparallelization_upper_bound (compile-time, both joins and table scans) and reparallelization_selectivity_threshold (runtime, only table scans) |

Figure 3B:
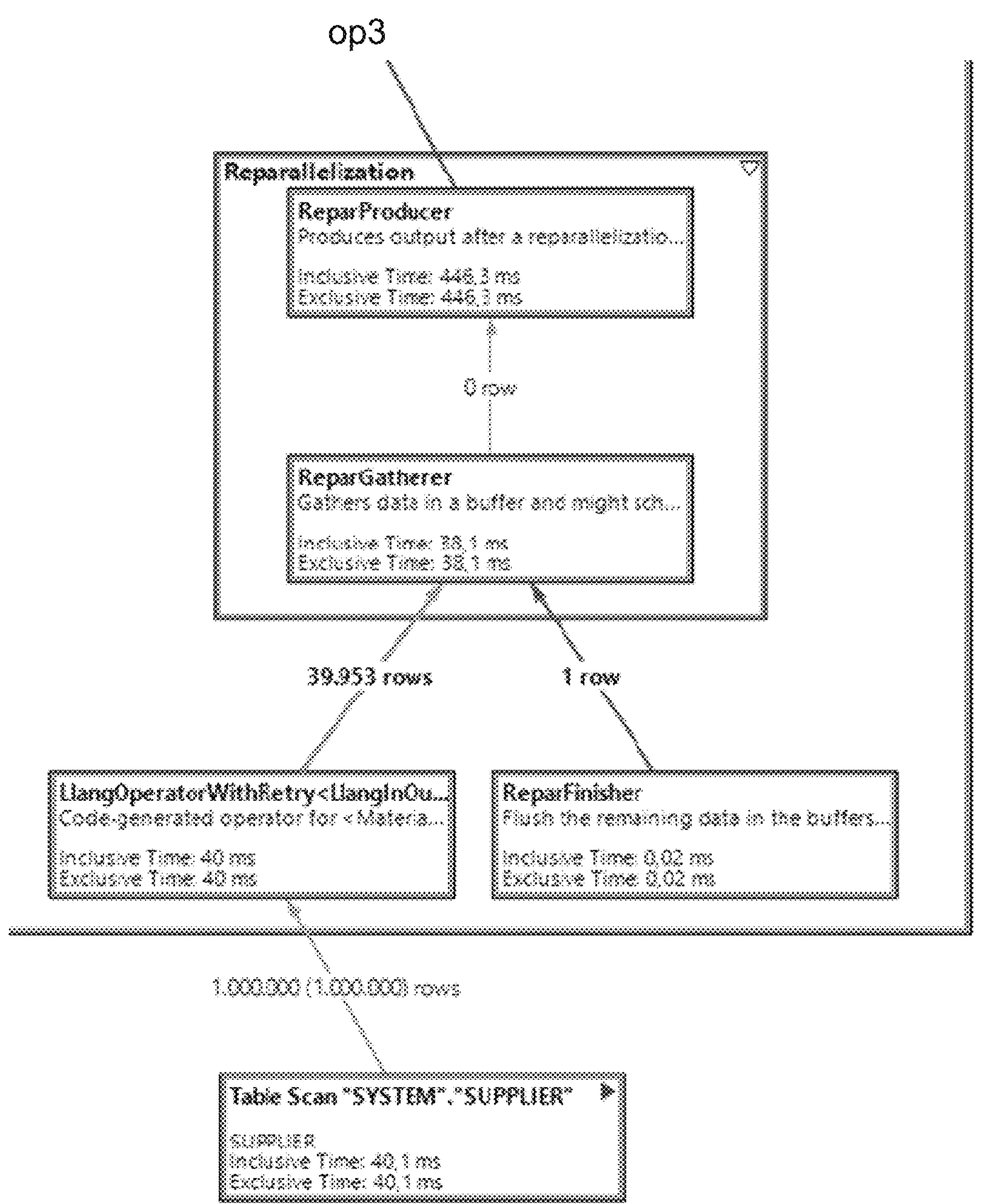
FIG. 3B depicts a schematic diagram illustrating an example of operations implementing a reparallelization point, in accordance with some example embodiments.

FIG. 3B depicts a schematic diagram illustrating an example of operations implementing a reparallelization point, in accordance with some example embodiments. As shown in FIG. 3B, in some example embodiments, each reparallelization point may include three operations including, for example, a reparallelization gatherer operation, a reparallelization producer operation, and a reparallelization finisher operation. The reparallelization gatherer operation, may be configured to gather input data (e.g., the third dataset 330 output from the preceding second operation op2) into buffers (e.g., the one or more buffers 340). Once the buffers are full, the reparallelization gatherer operation may schedule the tasks operating on the data contained therein. Moreover, the reparallelization gatherer operation may be responsible the sampling in which the task size for one or more subsequent operations in the same pipeline (e.g., the third operation op3) is determined based on the time required to perform those operations on a portion of the data held in the buffer.

Referring again to FIG. 3B, the reparallelization producer operation may receive, as output from the reparallelization gatherer operation, the data associated with individual tasks. As shown in FIG. 3B, the reparallelization producer operation may push this data further down the query pipeline to one or more subsequent operations (e.g., the third operation op3). Meanwhile, the reparallelization finisher operation may initiate a new pipeline immediately after a workload skewing operation (e.g., a join operation, a table scan operation, and/or the like). In the event the reparallelization gatherer operation still has buffers that are not completely full, the reparallelization finisher operation may force the reparallelization gatherer operation to run one more time in order to flush the contents of the buffers.

As noted, the buffering of data between successive operations in a query pipeline may incur a memory overhead. This memory overhead may be minimized by buffering data for a single task before scheduling the tasks directly. However, doing so may be disadvantageous for a number of reasons including the overhead associated with creating the common task state used to communicate data between the aforementioned reparallelization gatherer operation and the reparallelization producer operation. Buffering data for a single task and scheduling each task independently may also impair the memory locality of the threads accessing this data. Accordingly, in some example embodiments, at each reparallelization point, the corresponding scheduling operation may pack multiple tasks into a buffer and define the tasks as a parallel-for in order to schedule multiple tasks at the same time. The parallel-for may be defined as a collection of tasks of similar nature, which are scheduled (e.g., added to a queue holding work to be performed) in a single step but are executed by different worker threads.

The quantity of tasks that may be scheduled in parallel at each reparallelization point may be associated with an upper limit (e.g., reparallelization_max_numparallel_fors=50). The size of the buffer is therefore allocated to accommodate the expected output associated with the maximum quantity of parallel tasks. However, to avoid an overshoot in memory footprint, the size of the buffer may also be subjected to an upper limit (e.g., reparallelization_buffer_size_upper_bound_in_rows=1 Million).

One exception to having multiple tasks in a buffer is reparallelization points in a projection pipeline. That is, in some example embodiments, the data execution engine 150 may implement single task buffering upon inserting a reparallelization point after a workload skewing operation in a projection pipeline. The reason for this deviation is to support result streaming, in which the data execution engine 150 processes a sufficient quantity of data to satisfy an initial fetch call (e.g., for a first response to the client device 102). The data execution engine 150 may process additional data only if there are more fetch calls from the client device 102. As such, with result streaming, the data execution engine 150 may operate to maximize the speed at which it is able to respond to the initial fetch call with the corresponding data. Storing multiple tasks in the buffers before parallelizing would therefore be counterproductive to this goal.

In some example embodiments, multiple threads may be active during the sampling phase at each reparallelization point. That is, all active threads may initially attempt to perform sampling, which may be complete upon satisfaction of one or more conditions including, for example, the exhaustion of a (pre-defined) time budget, convergence in the results (e.g., less than a threshold difference of two or more consecutive measurements), a measurement exceeding a cost budget (e.g., more than twice the cost per task, which is a configuration parameter defining a target time for a particular task), and/or the like. In some cases, sampling may also cease upon reaching a decision not to parallelize at all. This latter scenario may occur if the cost of parallelization exceeds a certain threshold. For example, the data execution engine 150 may determine to avoid parallelization if the time required to copy data into the buffers is higher than the time to perform the remaining operations in the pipeline. Alternatively and/or additionally, the data execution engine 150 may determine to avoid parallelization if, based on the current task size and estimated output, there will be less than a threshold quantity of tasks.

In some example embodiments, each thread may compute an average among its samples before updating a global variable corresponding to a summary value (e.g., a minimum value) of the averages encountered by every threads. Nevertheless, the data execution engine 150 may impose a limit on how many threads are required to complete their sampling before the data execution engine 150 determines that the sampling phase is complete. For example, the data execution engine 150 may stop the sampling phase associated with a reparallelization point when the data execution engine 150 determines that an n quantity of threads (e.g., two threads) have completed their respective sampling.

Figure 4:
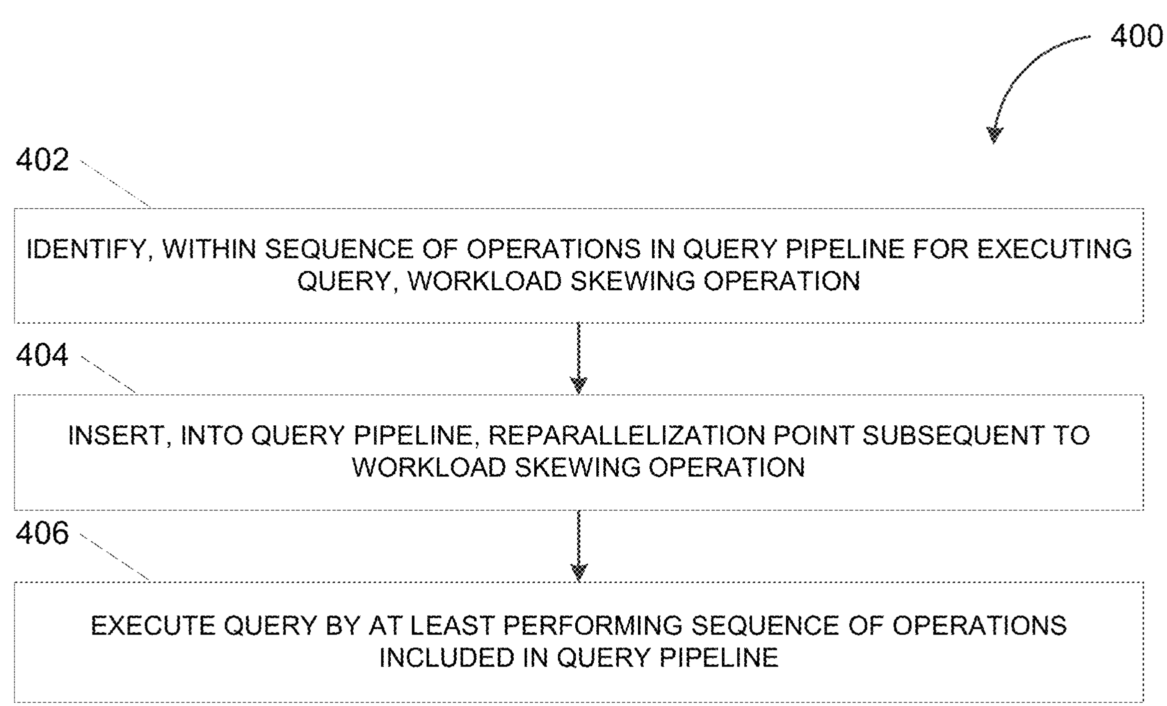
FIG. 4 depicts a flowchart illustrating an example of a process for reparallelization, in accordance with some example embodiments.

FIG. 4 depicts a flowchart illustrating an example of a process 400 for reparallelization, in accordance with some example embodiments. Referring to FIG. 4, the process 400 may be performed by the data execution engine 150 to execute a query operating on a dataset.

At 402, the data execution engine 150 may identify, within a sequence of operations in a query pipeline for executing a query, a workload skewing operation. For instance, in the example of the query pipeline 300 shown in FIG. 3A, the data execution engine 150 may determine that the second operation op2 is a workload skewing operation whose input dataset 320 and output dataset 330 exhibits an above-threshold difference in size. The second operation op2 in this case may be a join operation (e.g., a selective join operation, an expanding join operation), a table scan (e.g., a selective table scan), and/or the like. The presence of a workload skewing operation, such as the second operation op2, may necessitate the insertion of a reparallelization point to determine a suitable task size for performing one or more subsequent operations such as the third operation op3.

At 404, the data execution engine 150 may insert, in the query pipeline, a reparallelization point subsequent to the workload skewing operation. Referring again to the example of the query pipeline 300 shown in FIG. 3A, upon identifying the second operation op2 as a workload skewing operation, the data execution engine 150 may insert a reparallelization point including the second scheduling operation S2 after the second operation op2. As shown in FIG. 3A, the query pipeline 300 may include a first scheduling operation S1, which may be performed to determine, based at least on a first quantity of time required to perform the first operation op1 on a portion of the first dataset 310, a first task size for the first operation op1 and the second operation op2. The data execution engine 150 may insert the second scheduling operation S2 after the second operation op2 such that the second scheduling operation S2 may be performed to determine based at least on a second quantity of time required to perform the third operation op3 on a portion of the third dataset 330, a second task size one or more subsequent operations in the query pipeline 300 (e.g., the third operation op3). The second task size may be more suitable for performing the third operation op3 at least because of the size of the third dataset 330 output by the second operation op2 renders the third operation op3 less computationally expensive than the preceding first operation op1 and second operation op2. For less computationally expensive operations such as the third operation op3, a smaller quantity of larger sized tasks may be more optimal than a larger quantity of smaller tasks. Nevertheless, it should be appreciated that the data execution engine 150 may impose a lower bound (e.g., a minimum task size) on the first task size and/or the second task size in order to ensure there are a sufficient quantity of tasks for each active thread.

At 406, the data execution engine 150 may execute the query by at least performing the sequence of operations included in the query pipeline. For instance, in the example shown in FIG. 3A, the data execution engine 150 may execute the query by performing the sequence of operations included in the query pipeline 300 including the first scheduling operation to schedule the tasks associated with the first operation op1 and the second operation op2 having the first task size and the second scheduling operation S2 to schedule the tasks associated with at least the third operation op3 having the second task size. As shown in FIG. 3A, the second scheduling operation S2 (e.g., the reparallelization gatherer operation) may gather the third dataset 330 output from the second operation op2 into the one or more buffers 340. In some example embodiments, the second scheduling operation S2 may schedule the corresponding tasks once the one or more buffers 340 are full. Moreover, the reparallelization gatherer operation may provide the data associated with each task to the reparallelization producer operation, which then pushes this data further down the query pipeline 300 to one or more subsequent operations such as the third operation op3.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: identifying, within a sequence of operations comprising a query pipeline for executing a query, a workload skewing operation whose input dataset and output dataset exhibit an above-threshold difference in size; inserting, in the query pipeline, a reparallelization point subsequent to the workload skewing operation, the reparallelization point including a first scheduling operation configured to determine a first task size for performing at least a first operation following the workload skewing operation in the query pipeline; and executing the query by at least performing the sequence of operations comprising the query pipeline.

Example 2: The system of Example 1, wherein the first task size is determined based at least on a quantity of time required to perform at least the first operation on a portion of the output dataset from the workload skewing operation.

Example 3: The system of any one of Examples 1 to 2, wherein the scheduling operation is configured to gather the output dataset of the workload skewing operation into one or more buffers.

Example 4: The system of Example 3, wherein the scheduling operation is further configured to schedule, based at least on the first task size, one or more corresponding tasks for performance by a corresponding quantity of threads once the one or more buffers are full, and wherein data associated with each task is pushed to at least the first operation following the workload skewing operation.

Example 5: The system of Example 4, wherein the scheduling operation is configured to avoid parallelization based at least on a first time required to gather the output dataset of the workload skewing operation into one or more buffers exceeding a second time required to perform at least the first operation following the workload skewing operation.

Example 6: The system of any one of Examples 4 to 5, wherein the scheduling operation is configured to avoid parallelization based at least on there being less than a threshold quantity of tasks of the first task size.

Example 7: The system of any one of Examples 4 to 6, wherein the one or more buffers are configured to accommodate data for multiple tasks, and wherein the scheduling operation is configured to schedule the multiple tasks in parallel.

Example 8: The system of any one of Examples 1 to 7, wherein the query pipeline further includes a second scheduling operation configured to determine a second task size for performing at least a second operation preceding the workload skewing operation.

Example 9: The system of Example 8, wherein the second task size is determined based at least on a quantity of time required to perform at least the second operation to generate the input dataset of the workload skewing operation.

Example 10: The system of any one of Examples 1 to 9, wherein the workload skewing operation comprises a selective join operation, an expanding join operation, or a selective table scan operation.

Example 11: The system of any one of Examples 1 to 10, wherein the workload skewing operation is identified based on a compile time estimation and/or a runtime estimation of a first size of the input dataset and a second size of the output dataset.

Example 12: A method, comprising: identifying, within a sequence of operations comprising a query pipeline for executing a query, a workload skewing operation whose input dataset and output dataset exhibit an above-threshold difference in size; inserting, in the query pipeline, a reparallelization point subsequent to the workload skewing operation, the reparallelization point including a first scheduling operation configured to determine a first task size for performing at least a first operation following the workload skewing operation in the query pipeline; and executing the query by at least performing the sequence of operations comprising the query pipeline.

Example 13: The method of Example 12, wherein the first task size is determined based at least on a quantity of time required to perform at least the first operation on a portion of the output dataset from the workload skewing operation.

Example 14: The method of any one of Examples 12 to 13, wherein the scheduling operation is configured to gather the output dataset of the workload skewing operation into one or more buffers, wherein the scheduling operation is further configured to schedule, based at least on the first task size, one or more corresponding tasks for performance by a corresponding quantity of threads once the one or more buffers are full, and wherein data associated with each task is pushed to at least the first operation following the workload skewing operation.

Example 15: The method of Example 14, wherein the scheduling operation is configured to avoid parallelization based at least on a first time required to gather the output dataset of the workload skewing operation into one or more buffers exceeding a second time required to perform at least the first operation following the workload skewing operation.

Example 16: The method of any one of Examples 14 to 15, wherein the scheduling operation is configured to avoid parallelization based at least on there being less than a threshold quantity of tasks of the first task size.

Example 17: The method of any one of Examples 14 to 16, wherein the one or more buffers are configured to accommodate data for multiple tasks, and wherein the scheduling operation is configured to schedule the multiple tasks in parallel.

Example 18: The method of any one of Examples 12 to 17, wherein the query pipeline further includes a second scheduling operation configured to determine a second task size for performing at least a second operation preceding the workload skewing operation, wherein the second task size is determined based at least on a quantity of time required to perform at least the second operation to generate the input dataset of the workload skewing operation.

Example 19: The method of any one of Examples 12 to 18, wherein the workload skewing operation is identified based on a compile time estimation and/or a runtime estimation of a first size of the input dataset and a second size of the output dataset.

Example 20: A non-transitory computer readable medium storing instructions, which when executed by at least one data processor, result in operations comprising: identifying, within a sequence of operations comprising a query pipeline for executing a query, a workload skewing operation whose input dataset and output dataset exhibit an above-threshold difference in size; inserting, in the query pipeline, a reparallelization point subsequent to the workload skewing operation, the reparallelization point including a first scheduling operation configured to determine a first task size for performing at least a first operation following the workload skewing operation in the query pipeline; and executing the query by at least performing the sequence of operations comprising the query pipeline.

Figure 5:
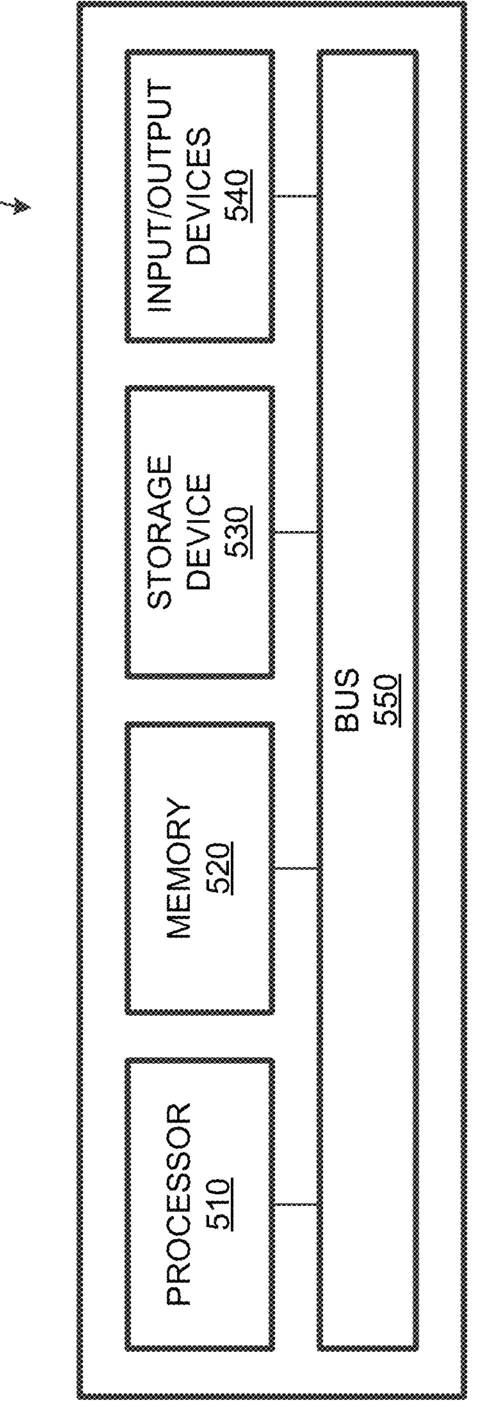
FIG. 5 depicts a block diagram illustrating an example of a computing system, in accordance with some example embodiments.

FIG. 5 depicts a block diagram illustrating an example of a computing system 500 consistent with implementations of the current subject matter. Referring to FIGS. 1-5, the computing system 500 may implement the data execution engine 150 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the data execution engine 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially databased ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:

at least one data processor; and at least one memory storing instructions which, when executed by the at least one data processor, cause operations comprising:

determining whether an operation within a query pipeline is a workload skewing operation, wherein the query pipeline is an architecture in which a query is divided into a sequence of operations for execution of the query, wherein a size of an output dataset of the workload skewing operation is more than a threshold larger or more than a threshold smaller than an input dataset of the workload skewing operation, and wherein the query pipeline comprises one or more first operations following a first scheduling operation that is performed to determine a first task size for the one or more first operations based on a first quantity of time required to perform the one or more first operations on a first portion of the output dataset;

in response to determining that an operation is a workload skewing operation, inserting, in the query pipeline, a reparallelization point subsequent to the workload skewing operation, wherein the reparallelization point includes a second scheduling operation that is performed to copy the output dataset of the workload skewing operation into one or more buffers and determine a second task size for one or more second operations following the second scheduling operation in the query pipeline based on a second quantity of time required to perform the one or more second operations on a second portion of the output dataset smaller than the first portion of the output dataset, wherein the second scheduling operation is further configured to schedule, based at least on the second task size, one or more corresponding tasks for performance by a corresponding quantity of threads once the one or more buffers are full;

repeating, at each of multiple subsequent points of the query pipeline, the determining and the inserting to insert one or more additional reparallelization points in the query pipeline in response to determining that one or more additional operations is a workload skewing operation; and executing the query by at least performing the sequence of operations comprising the query pipeline.

2. The system of claim 1, wherein data associated with each task is pushed to the one or more second operations following the workload skewing operation.

3. The system of claim 2, wherein the second scheduling operation is configured to avoid parallelization based at least on a first time required to gather the output dataset of the workload skewing operation into one or more buffers exceeding the second quantity of time required to perform the one or more second operations following the workload skewing operation.

4. The system of claim 2, wherein the second scheduling operation is configured to avoid parallelization based at least on there being less than a threshold quantity of tasks of the second task size.

5. The system of claim 2, wherein the one or more buffers are configured to accommodate data for multiple tasks, and wherein the second scheduling operation is configured to schedule the multiple tasks in parallel.

6. The system of claim 1, wherein the workload skewing operation comprises a selective join operation, an expanding join operation, or a selective table scan operation.

7. The system of claim 1, wherein the workload skewing operation is identified based on a compile time estimation or a runtime estimation of a first size of the input dataset and a second size of the output dataset.

8. A computer-implemented method, comprising:

determining whether an operation within a query pipeline is a query is a workload skewing operation, wherein the query pipeline is an architecture in which a query is divided into a sequence of operations for execution of the query, wherein a size of an output dataset of the workload skewing operation is more than a threshold larger or more than a threshold smaller than an input dataset of the workload skewing operation, and wherein the query pipeline comprises one or more first operations following a first scheduling operation that is performed to determine a first task size for the one or more first operations based on a first quantity of time required to perform the one or more first operations on a first portion of the output dataset;

in response to determining that an operation is a workload skewing operation, inserting, in the query pipeline, a reparallelization point subsequent to the workload skewing operation, wherein the reparallelization point includes a second scheduling operation that is performed to copy the output dataset of the workload skewing operation into one or more buffers and determine a second task size for one or more second operations following the second scheduling operation in the query pipeline based on a second quantity of time required to perform the one or more second operations on a second portion of the output dataset smaller than the first portion of the output dataset, wherein the second scheduling operation is further configured to schedule, based at least on the second task size, one or more corresponding tasks for performance by a corresponding quantity of threads once the one or more buffers are full;

repeating, at each of multiple subsequent points of the query pipeline, the determining and the inserting to insert one or more additional reparallelization points in the query pipeline in response to determining that one or more additional operations is a workload skewing operation; and executing the query by at least performing the sequence of operations comprising the query pipeline.

9. The method of claim 8, wherein data associated with each task is pushed to the one or more second operations following the workload skewing operation.

10. The method of claim 9, wherein the second scheduling operation is configured to avoid parallelization based at least on a first time required to gather the output dataset of the workload skewing operation into one or more buffers exceeding the second quantity of time required to perform the one or more second operations following the workload skewing operation.

11. The method of claim 9, wherein the second scheduling operation is configured to avoid parallelization based at least on there being less than a threshold quantity of tasks of the second task size.

12. The method of claim 9, wherein the one or more buffers are configured to accommodate data for multiple tasks, and wherein the second scheduling operation is configured to schedule the multiple tasks in parallel.

13. The method of claim 8, wherein the workload skewing operation is identified based on a compile time estimation or a runtime estimation of a first size of the input dataset and a second size of the output dataset.

14. A non-transitory computer readable medium storing instructions, which when executed by at least one data processor, result in operations comprising:

determining whether an operation within a query pipeline is a workload skewing operation, wherein the query pipeline is an architecture in which a query is divided into a sequence of operations for execution of the query, wherein a size of an output dataset of the workload skewing operation is more than a threshold larger or more than a threshold smaller than an input dataset of the workload skewing operation, and wherein the query pipeline comprises one or more first operations following a first scheduling operation that is performed to determine a first task size for the one or more first operations based on a first quantity of time required to perform the one or more first operations on a first portion of the output dataset;

in response to determining that an operation is a workload skewing operation, inserting, in the query pipeline, a reparallelization point subsequent to the workload skewing operation, wherein the reparallelization point includes a second scheduling operation that is performed to copy the output dataset of the workload skewing operation into one or more buffers and determine a second task size for one or more second operations following the second scheduling operation in the query pipeline based on a second quantity of time required to perform the one or more second operations on a second portion of the output dataset smaller than the first portion of the output dataset, wherein the second scheduling operation is further configured to schedule, based at least on the second task size, one or more corresponding tasks for performance by a corresponding quantity of threads once the one or more buffers are full;

repeating, at each of multiple subsequent points of the query pipeline, the determining and the inserting to insert one or more additional reparallelization points in the query pipeline in response to determining that one or more additional operations is a workload skewing operation; and executing the query by at least performing the sequence of operations comprising the query pipeline.

* * * * *